April 19, 1966  E. BRETHERICK  3,246,772
BODY LOCATING ASSEMBLIES
Filed Nov. 20, 1963  2 Sheets-Sheet 1
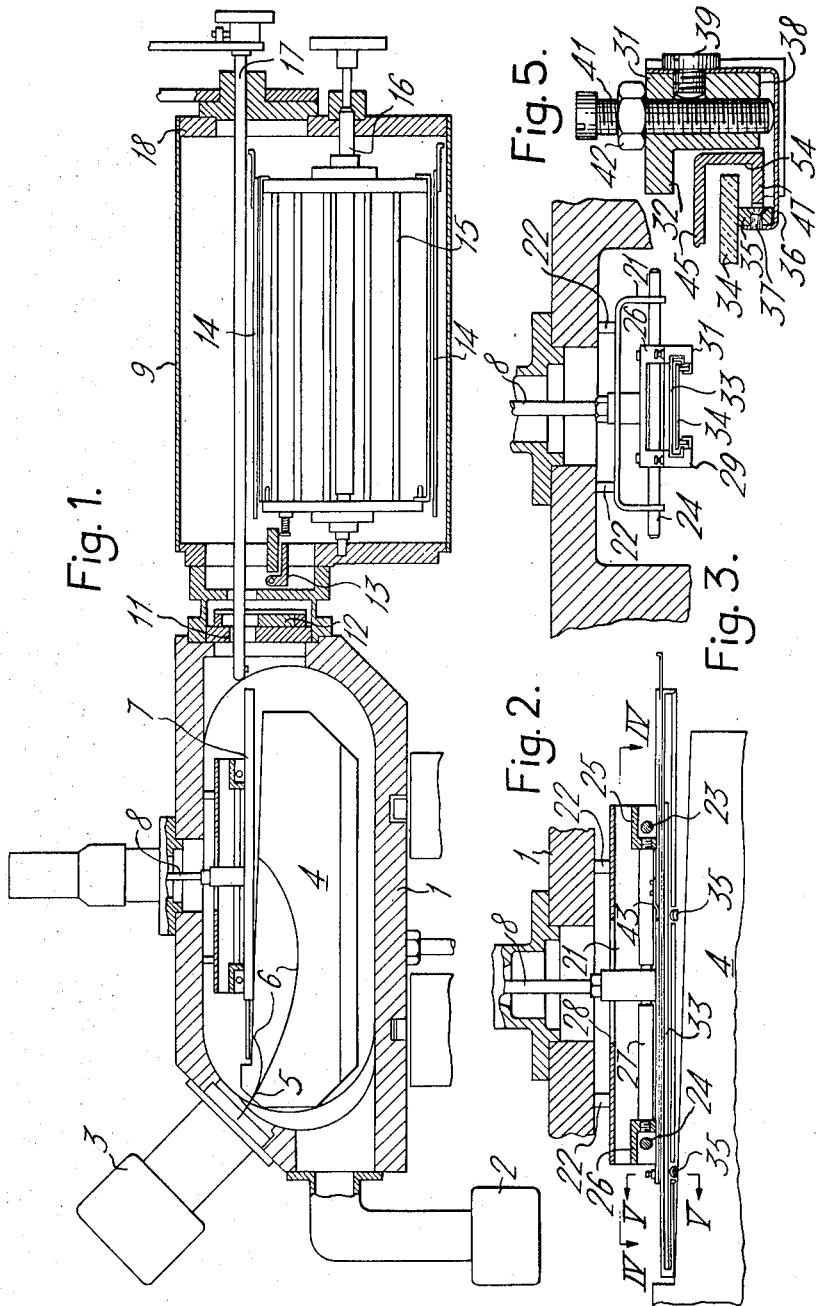

April 19, 1966  E. BRETHERICK  3,246,772
BODY LOCATING ASSEMBLIES
Filed Nov. 20, 1963  2 Sheets-Sheet 2
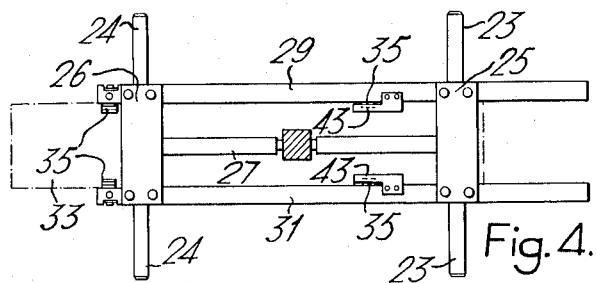
Fig. 4.
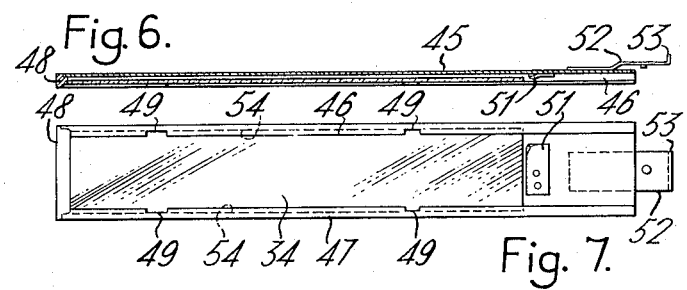
Fig. 6.
Fig. 7.

# United States Patent Office 3,246,772
Patented Apr. 19, 1966

3,246,772
BODY LOCATING ASSEMBLIES
Edmund Bretherick, Sale, England, assignor to Associated Electrical Industries Limited, London, England, a British company
Filed Nov. 20, 1963, Ser. No. 325,009
Claims priority, application Great Britain, Nov. 23, 1962, 44,452/61
9 Claims. (Cl. 214—1)

The present invention relates to body locating assemblies and has a particular application in a mass spectrometer magnetic analyser in which a plate, one surface of which is coated with a layer of emulsion sensitive to bombardment by ions, has to be located accurately relative to the other components of the mass spectrometer. This plate is used to record an ion spectrum of a sample being analysed in a well known manner.

It is necessary to locate the plate very accurately relative to the other components of the mass spectrometer and it is also necessary to be able to move the plate into and out of the evacuated chamber of the magnetic analyser. In order to prevent damage being done to the plate as it is moved, the plate is conveniently supported in a carrier member and means are provided for moving the carrier member into and out of the chamber. Conveniently when the plate is completely withdrawn from the magnetic analyser it is enclosed in a light proof cassette, part of which is formed by the carrier member.

Due to the possibility of distortion of the carrier member and in order to allow different sized plates to be used it is not always convenient to use the carrier member to locate the plate accurately in the magnetic analyser.

The object of the present invention is to provide an improved body locating assembly.

According to the present invention a body locating assembly comprises a fixed body locating structure and a movable body carrier member adapted to support said body freely and to be moved relative to said locating structure so that said body can be moved in to a position in which it is located by said locating structure independently of said carrier member.

Since the locating structure locates the body independently of the carrier member, any distortion of the carrier member does not affect the location of the body.

Preferably the locating structure comprises at least one locating member which is adapted to make contact with one surface of said body so as to locate said surface accurately. With such an arrangement, the accurate location of said surface is independent of the size of the body.

In a preferred arrangement the locating structure comprises a plurality of locating members which are adapted to make contact with spaced apart portions of one surface of said body so as to locate said surface accurately. The positions of the locating members are conveniently adjustable.

In order that the invention may be more readily understood reference will now be made to the accompanying drawings, in which:

FIG. 1 is a diagrammatic side view, partly in section, of a mass spectrometer magnetic analyser including a plate holder assembly embodying the invention, FIG. 2 is a sectioned side view on a larger scale of the locating structure of the plate holder assembly illustrated in FIG. 1, FIG. 3 is an end view of the locating structure illustrated in FIG. 2, FIG. 4 is a plan view of the locating structure sectioned on the plane IV—IV of FIG. 2, FIG. 5 is an end view on a larger scale of part of the locating structure sectioned on the plane V—V of FIG. 2, FIG. 6 is a sectioned side view of the plate carrier member, and FIG. 7 is a plan view from below of the plate carrier member.

With reference to FIG. 1 the mass spectrometer magnetic analyser assembly comprises a chamber 1 adapted to be evacuated by a pump 2 and connected to an ion source 3. Within this chamber are mounted two magnetic pole pieces, one of which is illustrated at 4. These pole pieces cooperate with an electro-magnetic coil, not illustrated, to provide a magnetic field extending across the chamber in a direction at right angles to the paper. Ions from a sample being analysed are produced in the ion source and are formed into a beam 5 which passes into the magnetic field. The ions are deflected in the magnetic field in a well known manner in accordance with their masses. Therefore, ions of different masses will be deflected by different amounts and an ion spectrum 6 will be formed.

This ion spectrum is arranged to be received by a plate on one surface of which is a layer of emulsion sensitive to ions. The plate is supported in a locating structure 7. This structure locates the plate in the required position relative to the remaining components of the mass spectrometer and can be moved transversely relative to the ion beam and parallel to the magnetic field by means of a rod 8 which extends through the wall of chamber 1 in a gas tight manner.

The plate is supported in a carrier member and is adapted to be moved into and out of the chamber 1 so that it can be located in the required position and can be replaced by an unexposed plate when required. Replacement plates are stored in a magazine 9 which communicates with chamber 1 through an aperture 11. Sealing flaps 12 and 13 are used to seal aperture 11 when the magazine 9 is opened.

Each plate is housed in a light tight cassette 14. Part of each cassette is formed by the carrier member and the remaining components of each cassette are mounted on a revolving drum 15 which is supported on a shaft 16. By rotating the drum each cassette in turn can be moved into a position in which the enclosed plate can be transferred from the magazine 9 into the chamber 1.

Each plate together with its carrier member is adapted to slide out of the remaining components of the cassette. A rod 17 extends in a gas tight manner through the outer wall 18 of magazine 9 in order to permit this operation on the cassette which is in the loading position. Suitable guides are provided so that the rod 17 can be used to push the carrier member together with the plate through aperture 11 on to the locating structure 7 and subsequently to withdraw the plate and the carrier member back into the magazine when required.

This operation is described in greater detail in United States Patent No. 2,993,992. In the arrangement described in the above specification the plate is held firmly within the carrier member and the locating structure in the magnetic analyser is used to locate the carrier member in the required position. Therefore, the position of the plate is dependent on the carrier member. If the carrier member is distorted in any way or if the plate is not of the correct thickness, the surface of the plate on which the emulsion layer is coated may not be located in the required position relative to the remaining components of the mass spectrometer. This will result in that the ion spectrum being recorded inaccurately. In accordance with the present invention the construction of the locating structure and the plate carrier member is modified so that the plate is located more accurately.

FIGS. 2, 3, 4, 5, 6, and 7 illustrate in greater detail an improved form of plate locating assembly which embodies the invention. With reference to FIGS. 2, 3, and 4, the locating structure of the assembly comprises a U-shaped member 21 supported by four rods 22 from the top wall of the chamber 1, two rods 23, 24 extending horizontally between the ends of the member 21 and parallel to the magnetic field in chamber 1, two carrier members 25, 26 supported respectively on rods 23, 24 and free to move thereon, a bar 27 extending between members 25, 26 and engaging with the end of rod 8 which extends through an aperture 28 in member 21, and two runners 29, 31 which extend between carrier members 25, 26 in a direction perpendicular to the magnetic field. The movement of rod 8 causes transverse movement of the two runners 29, 31 in the direction of the magnetic field.

Each runner 29, 31 is U-shaped in cross section, as illustrated more clearly in FIG. 5 which is on a larger scale, and provides a longitudinal channel 32. A carrier member 33 for plate 34 is adapted to slide along these channels so that the lower surfaces of the channels 32, provide a direct support for the carrier member 33. Four locating members 35 are attached to the runners 29, 31 and one of these is illustrated in detail in FIG. 5. The locating member 35 is made of stainless steel and is attached to a leaf spring 36 by a rivet 37 and the leaf spring extends through a gap 38 in the lower part of the runner and is secured to the outer side of the runner by a screw 39. The upper surface of locating member 35 is curved and projects appreciably above the level of the lower surface of channel 32. A threaded rod 41 extends through the runner and engages with the leaf spring 36 so as to vary the vertical position of the leaf spring and the locating member. Rod 41 is locked in position by a nut 42.

Carrier member 33 slides freely in the channels 32 and is forced towards the lower surface of the channels by two leaf springs 43 which are attached to the runners 29, 31.

The construction of the carrier member 33 is illustrated more clearly in FIGS. 6 and 7. The carrier member comprises a flat plate 45 along the edges of which extend two angle members 46, 47 and across one end of which extends a closing member 48. Four recesses 49 are formed in the edges of angle plates 46, 47. A small leaf spring 51 extends from the inner surface of plate 45. An arm 52 terminating in a hook 53 extends from the outer surface of the plate 45. Two channels 54 are formed between the inner surface of plate 45 and the angle members 46, 47 and these serve to retain the glass plate 34 freely. As seen more clearly in FIG. 5 the thickness of the glass plate 34 is appreciably less than the width of channel 54. The end of the plate abuts against the end member 48 and the spring 51 locates the plate longitudinally while permitting the plate to be slid into the channels 54 and to move freely within channels 54. The exposed surface of glass plate 34 is coated with a layer of ion sensitive emulsion in a well known manner so as to be sensitive to bombardment with ions.

The carrier member 33, enclosing the plate 34 is normally attached to the remaining components of the cassette 14 in magazine 9. When it is required to locate plate 34 in the magnetic analyser the end of rod 17 is moved so that it engages with hook 53 on the carrier member 33 and slides the carrier member together with the glass plate into chamber 1 on to the runners 29, 31. The carrier member 33 is supported in channels 32 as described above.

As the carrier member 33 is pushed along the channels 32 the locating members 35 engage with the lower surfaces of angle members 46, 47 and do not touch the glass plate 34 or the surface of the layer of emulsion. As the carrier member 33 is pushed further along the channels the four locating members 35 will eventually engage respectively in the four recesses 49 in the angle members 46, 47 and on passing into these recesses will make contact with the glass plate. The glass plate will then be raised off the lower surfaces of the channels 54 so that the plate is supported independently of the carrier member 33. The gaps between the plate 34 and the surfaces of the carrier member 33 are selected so that even if the carrier member is distorted the plate will not touch the carrier member but will be supported and located solely by the locating members 35.

Hence by accurately adjusting the position of the locating members 35 the lower surface of the plate 34 can be located accurately independently of the carrier member 33 and irrespective of the thickness of the plate, provided this lies within a certain range. The positions of the locating members 35 are spaced so that the deflection of the plate due to gravity is at a minimum.

In a practical arrangement a gap of approximately 0.025 in. exists between each side of the plate and the carrier member and the carrier member is flat to within 0.015 in. The plate is ten inches along and two inches wide.

It will be appreciated that the locating members do not rub on the emulsion on the lower surface of the plate 34 while the plate is being inserted into or withdrawn from its required position. Means may be provided for checking the locating structure to ensure that the locating members are accurately co-planar. Means may also be provided for adjusting the positions of the locating members from outside chamber 1.

In an alternative form of mass spectrometer embodying the invention the items 21, 22 in the above description are omitted and the rods 23, 24 are supported in holes in the side walls of chamber 1. Also the locknut 42 may be replaced by a suitably shaped spring retainer performing the same function.

The invention has been described with reference to the accurate location of a plate in the magnetic analyser of a mass spectrometer. It will however be appreciated that the invention can alternatively be used to provide accurate location of any body which is required to be moved in a carrier member into and out of a locating position in associated apparatus. The invention provides for accurate location of one surface of the body independent of the carrier member and substantially independent of the thickness of the body.

In a modified form of the invention, the accurately located surface of the body can extend in a vertical plane in the carrier member and can be forced against locating members also extending in a vertical plane.

What I claim is:

1. An arrangement for locating a photographic plate in an evacuable chamber comprising:
   (a) a chamber;
   (b) means for evacuating the chamber;
   (c) a locating structure adapted to locate a photographic plate within the chamber and including a plurality of locating members; and
   (d) a movable carrier member adapted to support the photographic plate freely and to be moved relative to the locating structure, so that the photographic plate can be moved into a position in which the locating members make contact with spaced apart points on a surface of the plate, so as to locate that surface and the plate accurately independently of the carrier member.

2. An arrangement for locating a photographic plate in an evacuable chamber comprising:
   (a) a chamber;
   (b) means for evacuating the chamber;
   (c) a locating structure adapted to locate a photographic plate within the chamber and including a plurality of locating members;
   (d) means for adjusting the position of each of the locating members;
   (e) and a movable carrier member adapted to support the photographic plate freely and to be moved relative to the locating structure, so that the photographic plate can be moved into a position in which the locating members make contact with spaced apart points on a surface of the plate, so as to locate that surface and the plate accurately independently of the carrier member.

3. An arrangement for locating a photographic plate in an evacuable chamber comprising:
   (a) a chamber;
   (b) means for evacuating the chamber;
   (c) a locating structure adapted to locate a photographic plate within the chamber and including a plurality of locating members;
   (d) and a movable carrier member adapted to support the photographic plate freely and to be moved relative to the locating structure, so that the photographic plate can be moved into a position in which the locating members make contact with spaced apart points on a substantially horizontal surface of the plate, so that distortion of the plate due to its weight is reduced to a minimum, and so as to locate said surface and said plate accurately and independently of the carrier member.

4. An arrangement for locating a photographic plate in an evacuable chamber comprising:
   (a) a chamber;
   (b) means for evacuating the chamber;
   (c) a locating structure adapted to locate a photographic plate within the chamber and including a plurality of locating members;
   (d) a movable carrier member adapted to support the photographic plate freely and to be moved relative to the locating structure, so that the plate can be moved into a position in which the locating members make contact with spaced apart points on a substantially vertical surface of the plate so as to locate that surface and the plate accurately and independently of the carrier member;
   (e) and means for forcing the substantially vertical surface of the plate against the locating members.

5. An arrangement as claimed in claim 1, wherein the locating structure includes two spaced parallel runners arranged to receive the carrier member and to permit it to slide therealong to a final position in which the plane of the plate extends between the two runners.

6. An arrangement as claimed in claim 1, wherein the locating structure includes two spaced parallel runners of substantially U-shaped cross-section arranged with their open sides facing each other to receive the carrier member and to permit it to slide therealong to a position in which the plane of the plate extends between the two runners and wherein the locating members are at spaced positions along the length of the runners, that part of the carrier member which slides in the runners being provided with apertures at positions which correspond to the positions of the locating members so that the locating members project through the apertures and contact the said surface of the plate so as to locate that surface accurately and independently of the carrier member.

7. An arrangement as claimed in claim 1, wherein the locating structure includes two spaced parallel runners arranged to receive the carrier member and to permit it to slide therealong to a final position in which the plane of the plate extends between the two runners, and wherein the locating members are at spaced positions along the length of the runners and are urged by spring means towards said surface of the plate, that part of the carrier member which slides in the runners being provided with apertures at spaced positions which correspond to the positions of the locating members so the locating members project through the apertures and contact said surface of the plate and locate said surface accurately and independently of the carrier member when the carrier member slides to the final position.

8. An arrangement as claimed in claim 2, wherein the locating structure includes two spaced parallel runners of substantially U-shaped cross-section arranged with their open sides facing each other to receive the carrier member and to permit it to slide therealong to a position in which the plane of the plate extends between the two runners, and wherein the locating members are at spaced positions along the length of the runners, that part of the carrier member which slides in the runners being provided with apertures at positions which correspond to the positions of the locating members so the locating members project through the aperture and contact the said surface of the plate so as to locate that surface accurately and independently of the carrier member.

9. An arrangement as claimed in claim 2, wherein the locating structure includes two spaced parallel runners arranged to receive the carrier member and to permit it to slide therealong to a final position in which the plane of the plate extends between the two runners, and wherein the locating members are at spaced positions along the length of the runners and are urged by spring means towards said surface of the plate, that part of the carrier member which slides in the runners being provided with apertures at spaced positions which correspond to the positions of the locating members so that the locating members project through the apertures and contact said surface of the plate and locate said surface accurately and independently of the carrier member when the carrier member slides to the final position.

References Cited by the Examiner

UNITED STATES PATENTS

| | | |
|---|---|---|
| 2,923,421 | 2/1960 | De Senigon de Roumefort. |
| 2,993,992 | 7/1961 | Craig. |

FOREIGN PATENTS

| | | |
|---|---|---|
| 1,126,584 | 3/1962 | Germany. |

MARVIN A. CHAMPION, *Primary Examiner.*